(12) United States Patent
Jeong

(10) Patent No.: US 10,361,588 B2
(45) Date of Patent: Jul. 23, 2019

(54) COUPLED RESONATOR IN A METAL BACK COVER

(71) Applicant: QUALCOMM Incorporated, San Diego, CA (US)

(72) Inventor: Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/149,024

(22) Filed: May 6, 2016

(65) Prior Publication Data

US 2017/0163094 A1 Jun. 8, 2017

Related U.S. Application Data

(60) Provisional application No. 62/264,196, filed on Dec. 7, 2015.

(51) Int. Cl.
| | |
|---|---|
| *H01F 38/00* | (2006.01) |
| *H02J 50/12* | (2016.01) |
| *G06F 1/26* | (2006.01) |
| *H02J 7/02* | (2016.01) |
| *H04B 1/40* | (2015.01) |
| *H02J 7/00* | (2006.01) |

(52) U.S. Cl.
CPC ............. *H02J 50/12* (2016.02); *G06F 1/266* (2013.01); *H02J 7/0042* (2013.01); *H02J 7/025* (2013.01); *H04B 1/40* (2013.01)

(58) Field of Classification Search
CPC .......... H02J 50/12; H02J 7/0042; H02J 7/025; G06F 1/266; H04B 1/40

USPC ......................................................... 307/104
See application file for complete search history.

(56) References Cited

U.S. PATENT DOCUMENTS

| | | | |
|---|---|---|---|
| 8,159,182 B2 | 4/2012 | Kato et al. | |
| 8,907,859 B2 | 12/2014 | Hsu et al. | |
| 9,084,343 B2 | 7/2015 | Waffenschmidt | |
| 2009/0261778 A1* | 10/2009 | Kook .................... | H02J 7/0044 320/108 |
| 2010/0194334 A1* | 8/2010 | Kirby .................... | H01M 10/46 320/108 |
| 2011/0084657 A1* | 4/2011 | Toya ..................... | H02J 7/0044 320/108 |
| 2014/0375262 A1* | 12/2014 | Yamaguchi ............. | H02J 50/90 320/108 |
| 2015/0123604 A1* | 5/2015 | Lee ....................... | H01F 38/14 320/108 |
| 2015/0137742 A1* | 5/2015 | Tseng .................... | H02J 7/025 320/108 |

(Continued)

OTHER PUBLICATIONS

International Search Report and Written Opinion—PCT/US2016/061024—ISA/EPO—dated Jan. 24, 2017—10 pgs.

*Primary Examiner* — Ryan Jager
(74) *Attorney, Agent, or Firm* — Hunter Clark PLLC

(57) ABSTRACT

An electronic device is disclosed, having electronic components and a metal case configured to house the electronic components. A power receiving element may be disposed on the metal case near an edge thereof. The power receiving element may couple with a magnetic field that emanates from the edge of the metal case, when the metal case is exposed to an externally generated magnetic field, to wirelessly receive power from the externally generated magnetic field.

23 Claims, 9 Drawing Sheets

(56) References Cited

U.S. PATENT DOCUMENTS

| | | | |
|---|---|---|---|
| 2015/0222128 A1* | 8/2015 | Hansen | A61N 1/3787 307/104 |
| 2015/0280482 A1* | 10/2015 | Rosenfeld | H02J 7/025 320/108 |
| 2016/0006293 A1 | 1/2016 | Jeong et al. | |
| 2016/0064814 A1* | 3/2016 | Jang | H01Q 1/526 343/842 |
| 2016/0072337 A1* | 3/2016 | Chang | H02J 50/10 320/108 |

* cited by examiner

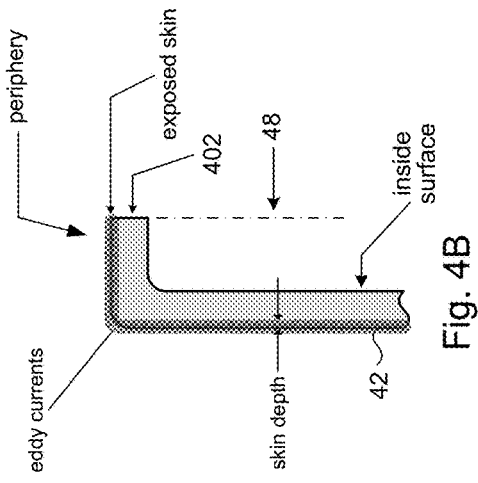
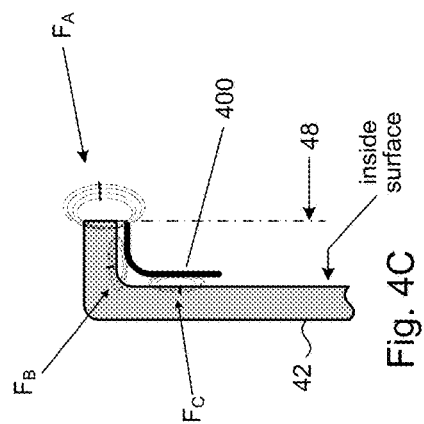
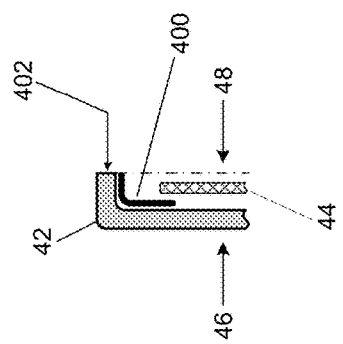
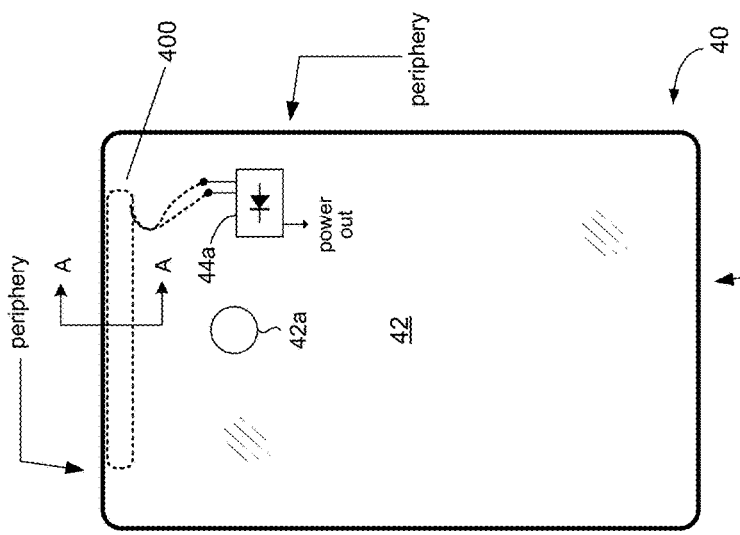

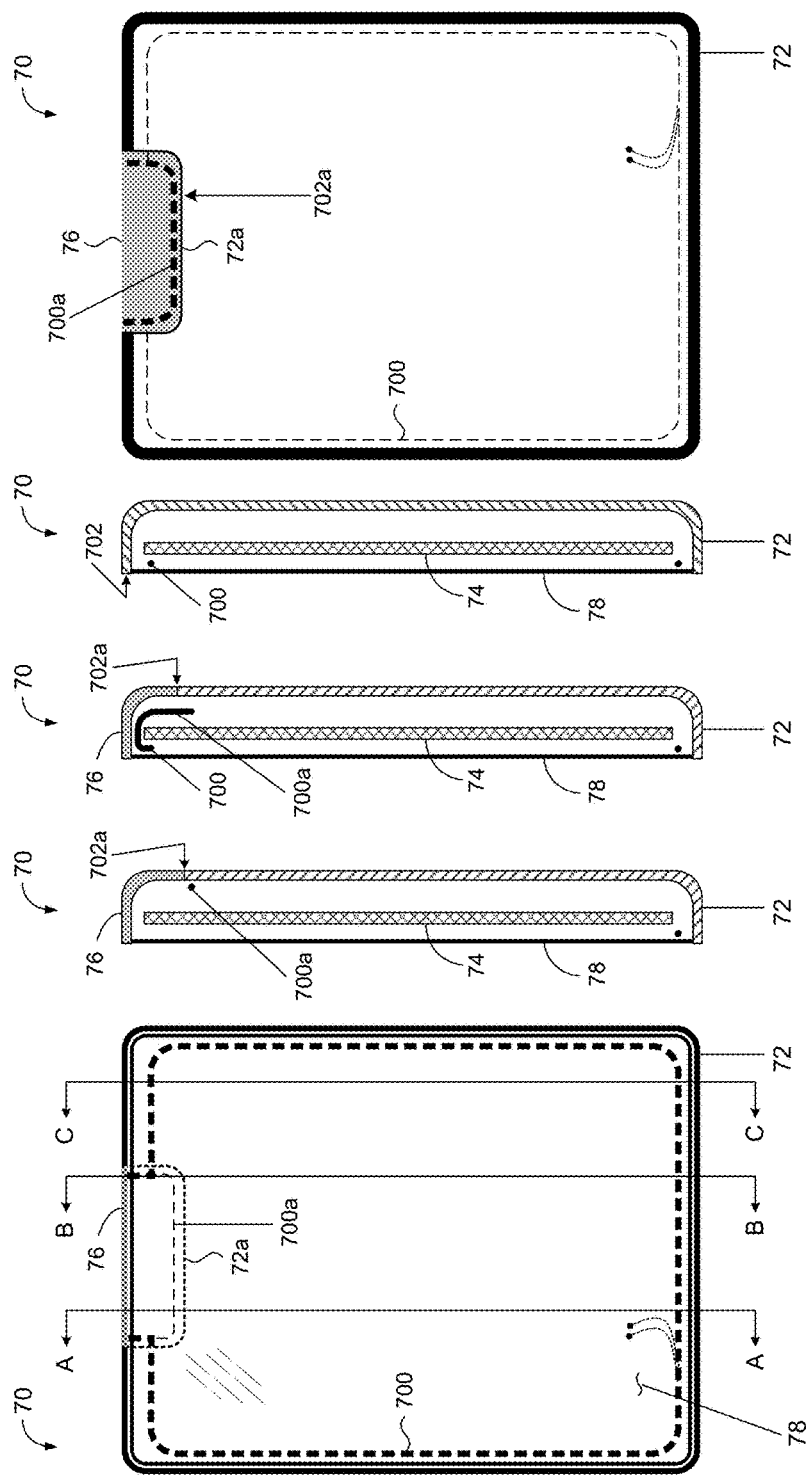

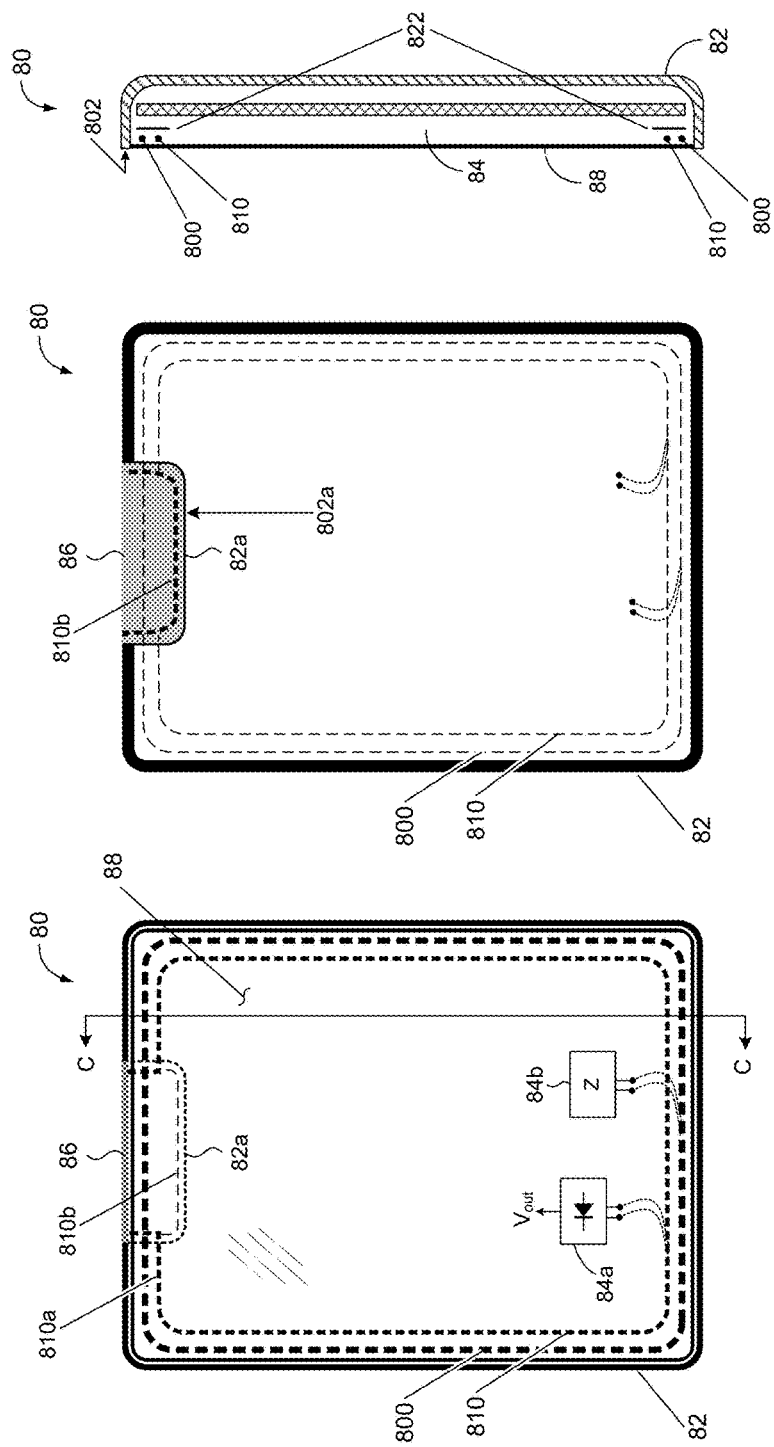

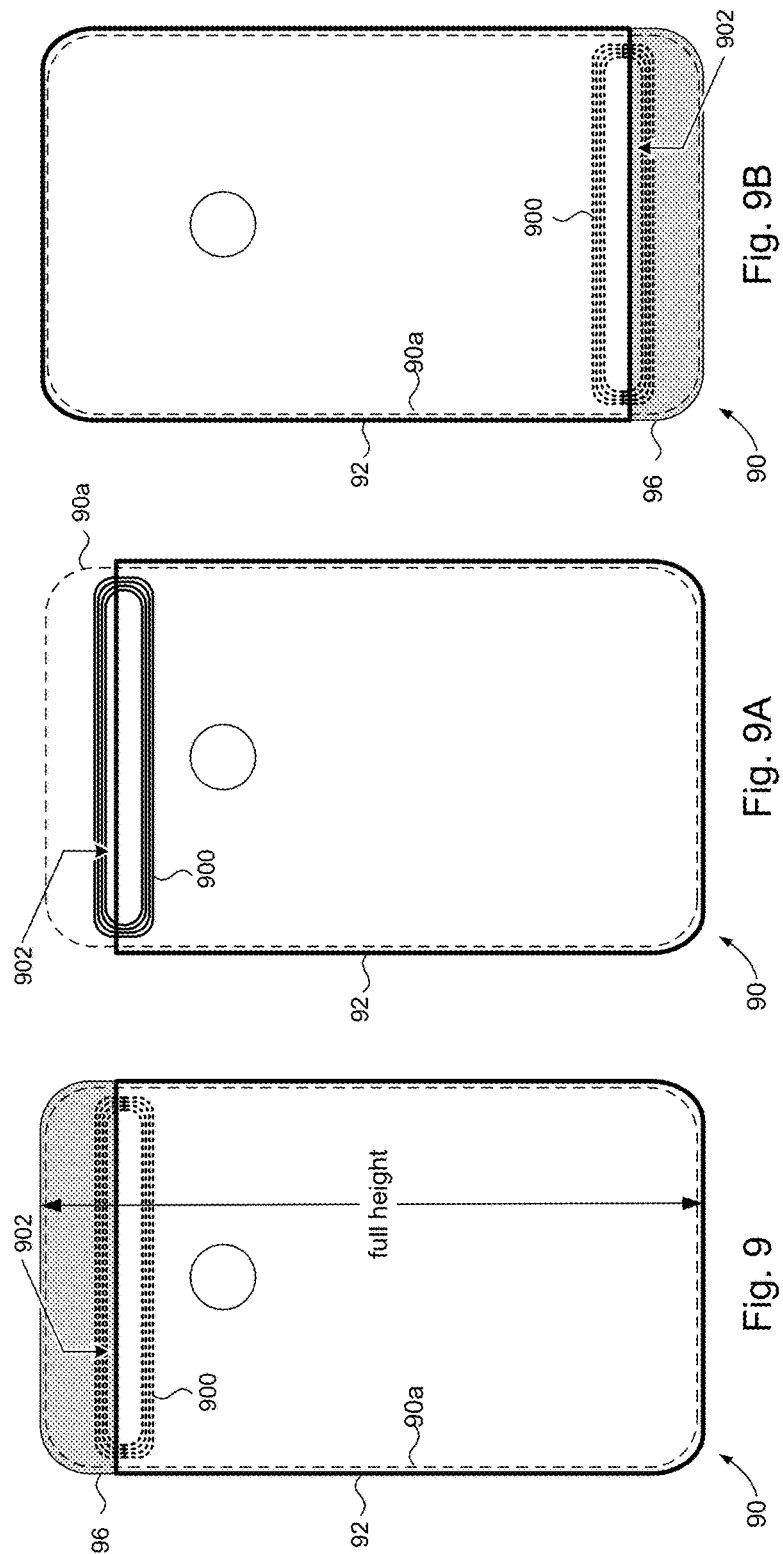

COUPLED RESONATOR IN A METAL BACK COVER

CROSS REFERENCE TO RELATED APPLICATIONS

Pursuant to 35 U.S.C. § 119(e), this application is entitled to and claims the benefit of the filing date of U.S. Provisional App. No. 62/264,196 filed Dec. 7, 2015, the content of which is incorporated herein by reference in its entirety for all purposes.

TECHNICAL FIELD

The present disclosure relates to wireless power transfer, and in particular to wireless power transfer in an electronic device having a metal back cover.

BACKGROUND

Wireless power transfer is becoming increasingly popular in portable electronic devices, such as mobile phones, computer tablets, etc. Such devices typically require long battery life and low battery weight. The ability to power an electronic device without the use of wires is an attractive solution for users of portable electronic devices. Wireless power transfer gives manufacturers an option for developing solutions to problems due to limited choices for power sources in consumer electronic devices.

Wireless power transfer capability can improve the user's charging experience. In a multiple device charging situation, for example, wireless power transfer may reduce overall cost (for both the user and the manufacturer) because conventional charging hardware such as power adapters and charging chords can be eliminated. There is flexibility in having different coil sizes and shapes on the transmitter and/or the receiver in terms of industrial design and support for a wide range of devices from mobile handheld devices to computer laptops.

Designs for portable electronic devices may include a metallic housing or casing to house the display screen and the electronics that comprise the electronic device. Metallic materials are a comment design choice for their aesthetic qualities and structural support. Metal, however, impedes electromagnetic radiation, thus impacting wireless communication. Accordingly, housing designs that include metallic back covers may include openings formed through metallic portions of the metallic back cover, or incorporate non-metallic portions. Likewise, metallic housings can reduce the effectiveness of wireless power transfer. Solutions may include making additional cutouts in the back cover or reducing the amount of metal in the back cover, which can impact the structure and aesthetic qualities of the electronic device.

SUMMARY

In accordance with some aspects of the present disclosure, an electronic device may include electronic components and a metal case configured to house the electronic components. A power receiving element may be disposed on the metal case near an edge of the metal case. The power receiving element may be configured to couple with a magnetic field that emanates from the edge of the metal case when the metal case is exposed to an externally generated magnetic field to produce wirelessly received power from the externally generated magnetic field.

In some aspects, the electronic device may include a rectifier circuit electrically connected to the power receiving element, and configured to rectify a voltage induced in the power receiving element to generate wirelessly received power.

In some aspects, the power receiving element may be disposed on one side of the edge of the metal case. The edge of the metal case may be at a top, bottom, or side of the metal case.

In some aspects, the power receiving element may encircle a periphery of the metal case. The electronic device may further include a display side and a transparent cover on the display side. The power receiving element may be disposed near the transparent cover.

In some aspects, the metal case may include a cutout at a periphery of the metal case. At least a portion of the edge of the metal case may be located at the cutout. The electronic device may further include one or more antennas configured for wireless communication and exposed through the cutout of the metal case.

In some aspects, the electronic device may further include an additional power receiving element configured to magnetically couple to the power receiving element. In some aspects, the power receiving element may be closer to the periphery of the metal case than the additional power receiving element. In some aspects, a portion of the power receiving element may lie across the edge of the metal case.

In accordance with some aspects of the present disclosure, a method for wireless power transfer may include inducing eddy currents in a metal case configured to house an electronic device and magnetically coupling to a magnetic field that emanates at a periphery of the metal case in response to the eddy currents induced in the metal case using a power receiving element arranged along the periphery of the metal case. Wirelessly received power for the electronic device may be generated from a voltage induced in the power receiving element.

In some aspects, the method may further include magnetically coupling to flux lines of the magnetic field that emanate from an edge at the periphery of the metal case.

In some aspects, the periphery of the metal case may be at a top, bottom, or side of the metal case.

In some aspects, the method may further include magnetically coupling to a magnetic field that emanates at a circumferential periphery of the metal case.

In some aspects, the method may further include magnetically coupling to a magnetic field that emanates from the power receiving element using an additional power receiving element. The method may further include tuning the additional power receiving element to have a resonant frequency substantially equal to a frequency of an externally generated magnetic field used to induce the eddy currents In some aspects, the method may further include illuminating the metal case with an externally generated magnetic field to induce the eddy currents in the metal case.

In some aspects, the method may further include setting a resonant frequency of the power receiving element substantially equal to a frequency of the externally generated magnetic field.

In some aspects, the method may further include operating the power receiving element at a frequency substantially equal to a frequency of the externally generated magnetic field.

In some aspects, the method may further include rectifying the voltage induced in the power receiving element to generate the wirelessly received power.

In accordance with some aspects of the present disclosure, an electronic device may include means for housing components that comprise the electronic device, means for magnetically coupling to an externally generated magnetic field to wirelessly receive power, the means for magnetically coupling may be arranged near an edge of the means for housing. The electronic device may further include means for producing wirelessly receive power from the means for magnetically coupling.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. The same or similar elements in the drawings may be identified by the same reference numerals. In the accompanying drawings:

FIGS. 4, 4A, 4B, and 4C illustrate examples of eddy current formation and other aspects of an electronic device in accordance with some embodiments of the present disclosure.

FIGS. 7, 7A, 7B, 7C, and 7D illustrate an example of a power receiving element and other aspects of an electronic device in accordance with some embodiments of the present disclosure.

FIGS. 8A, 8B, and 8C illustrate an example of a power receiving element and other aspects of an electronic device in accordance with some embodiments of the present disclosure.

FIGS. 9, 9A, and 9B illustrate an example of a power receiving element and other aspects of an electronic device in accordance with some embodiments of the present disclosure.

DETAILED DESCRIPTION

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
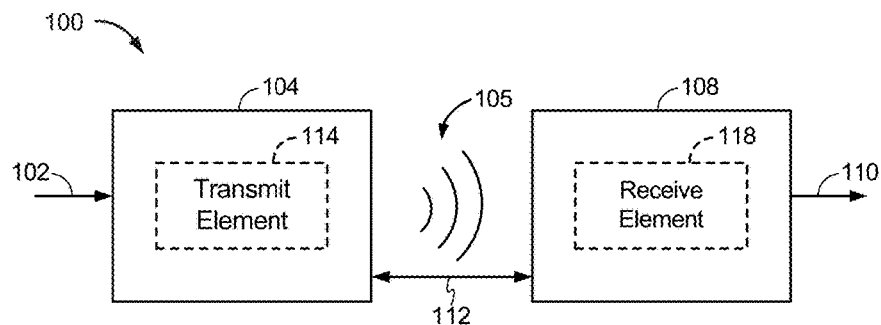
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field 105 with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
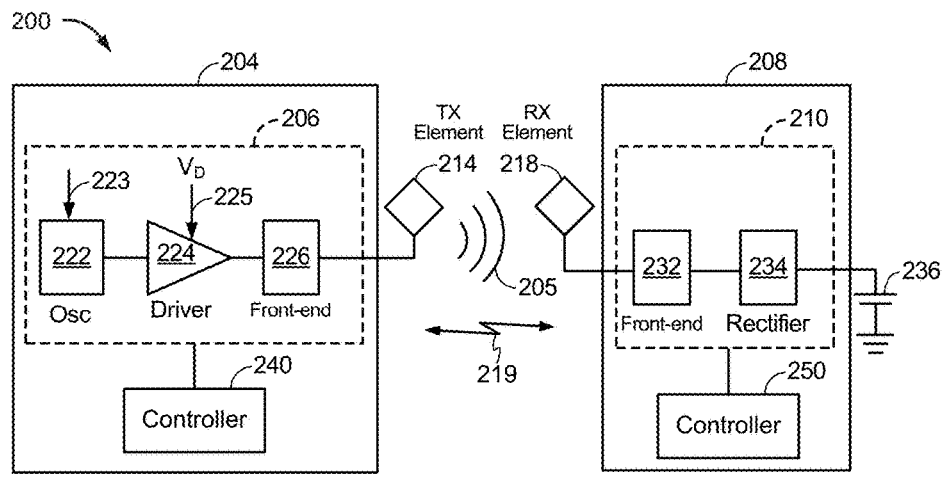
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
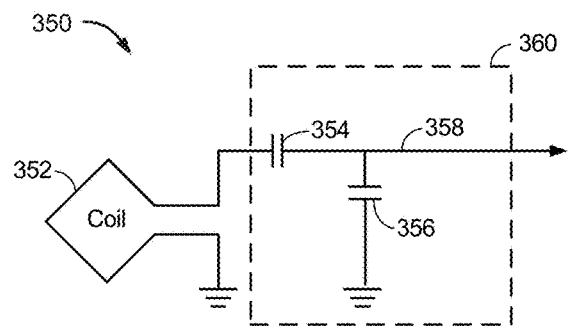
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

FIGS. 4 and 4A show an electronic device 40 (e.g., receiver 108, FIG. 1) configured to wirelessly receive power in accordance with the present disclosure. The back side 46 of the electronic device 40 may include means for housing components that comprise the electronic device. In some embodiments, for example, the electronic device 40 may include a metal case (metal back cover) 42 configured to house electronic components (electronics) 44 of the electronic device 40. The electronic components 44 may include a processor, memory, communication electronics, touch sensitive display, battery, and the like. The display side 48 of the electronic device 40 may include a transparent cover (not shown).

In some embodiments, the back side 46 of the metal case 42 may have very few openings or slots, which may be by design for aesthetic reasons. FIG. 4, for example, shows the metal case 42 having an opening 42a for a camera lens but is otherwise an unbroken surface. In some embodiments, the design of the metal case 42 may not include any openings (e.g., FIGS. 5A, 5B); for instance, in order to present a more clean look on the back side 46 of the electronic device 40.

In accordance with the present disclosure, the electronic device 40 may include means for magnetically coupling to an externally generated magnetic field. In some embodiments, for example, the electronic device 40 may include a power receiving element 400 disposed on the inside of metal case 42. FIG. 4A shows a cross sectional view along view line A-A in FIG. 4. In some embodiments, the power receiving element 400 may be disposed at a periphery of the metal case 42. As can be seen in FIG. 4A, a portion of the power receiving element 400 may be disposed along an edge 402 at a periphery of the metal case 42.

Referring to FIGS. 4B and 4C, in operation when the metal case is illuminated or otherwise exposed to an externally generated magnetic field (e.g., time varying magnetic field 105, FIG. 1), the externally generated magnetic field may induce eddy currents in the metal case 42, pictorially depicted in FIG. 4B. Persons of ordinary skill will understand that the eddy currents will tend to be distributed within the metal case 42 such that the current density is largest near the surface and decreases with greater depths in the metal case 42. This behavior is referred to as the skin effect. The eddy currents flow mostly within the "skin" of the metal case 42, between the outer surface and a level called the "skin depth." The skin depth is defined as the depth below the surface at which the current density is reduced by 1/e of the current density at the surface. The skin depth varies depending on the material of metal case 42. The skin depth also varies with the frequency (excitation frequency) of the externally generated magnetic field, and in particular skin depth is inversely proportional to frequency. For example, the formation of eddy currents may be restricted closer to the surface of the metal case 42 at megahertz frequencies (e.g., at 6.78 MHz) than at lower frequencies (e.g., 150 KHz) where eddy currents can form deeper into the metal case 42. At 6.78 MHz, the skin depth can be so small that the eddy currents basically flow only on the surface of the metal case 42.

If the skin depth is sufficiently deep into the metal case 42, the eddy currents in turn, may induce magnetic fields that emanate from the inside surface of the metal case 42. As depicted in FIG. 4C, for example, magnetic flux (flux lines) $F_A$ may emanate from the edge 402 of the metal case 42 and magnetic flux, e.g., $F_B$, $F_C$, may emanate from areas of the metal case 42 further away from the edge 402.

The power receiving element 400 may magnetically couple to the magnetic flux $F_A$, $F_B$, $F_C$. As a result of the coupling, a voltage may be induced in the power receiving element 400. The electronics 44 (FIG. 4A) may include means for producing wirelessly received power. In some embodiments, for example, a circuit 44a may be connected to the power receiving element 400 to rectify the induced voltage to produce wirelessly received power, which may then be used to power other electronics 44 in the electronic device 40. The circuit 44a may be a rectifier circuit. In some embodiments, the circuit 44a may include tuning circuitry (e.g., 360, FIG. 3) configured to tune a resonant frequency of the power receiving element 400 to a frequency of the externally generated magnetic field (e.g., time varying magnetic field 105, FIG. 1). Thus, despite that the metal case 42 has no openings that would allow the power receiving element 400 to directly couple to the externally generated magnetic field, the power receiving element 400 may nonetheless receive power wirelessly from the external magnetic field by way of the magnetic field $H_{case}$ ($F_A$, $F_B$, $F_C$) induced by the metal case 42. It is further noted that when resonance occurs between the power receiving unit 400 and the source of the externally generated magnetic field (e.g., power transmitting unit 204, FIG. 2), power can be effectively transmitted even with a low coupling coefficient k; e.g., k, can be 0.1 or less).

The flow of eddy currents at the edge 402 of the metal case 42 are largely independent of skin depth because the skin of the metal case 42 within which most of the eddy current flows is exposed at the edge 402. By contrast, the flow of eddy currents at the interior surfaces of the metal case 42 further away from the edge 402 are very much subject to the skin effect and can be much smaller than at the periphery depending on factors such as thickness, material, and excitation frequency. Accordingly, the magnetic flux $F_A$ that emanates from the edge 402 can be greater than the magnetic flux $F_B$, $F_C$ that emanates from areas of the of the metal case 42 further away from the edge 402. For example, eddy currents can form at the edge 402 whether the excitation frequency (e.g., of the externally generated magnetic field) is 150 KHz or 6.78 MHz since the skin is exposed at the edge 402. On the other hand, the magnetic flux $F_B$, $F_C$ may be insignificant at 6.78 MHz due to small skin depth, resulting in little or no eddy currents in areas of the of the metal case 42 further away from the edge 402, whereas the magnetic $F_B$, $F_C$ may be much more significant at 150 KHz where the skin depth is greater.

The stronger magnetic flux $F_A$ at the edge 402 of the metal case 42 can induce more voltage in the power receiving element 400 than can the weaker magnetic flux $F_B$, $F_C$. In accordance with the present disclosure, at least a portion of the power receiving element 400 may be disposed close to the edge 402 of the metal case 42, as illustrated for example in FIGS. 4 and 4A, in order to couple to the magnetic flux $F_A$ (thus increasing mutual inductance between the power receiving element 400 and metal case 42), and hence increase the amount of power that can be wirelessly received from the externally generated magnetic field.

FIG. 4 shows the power receiving element 400 disposed at the upper (top) periphery of the metal case 42. In various embodiments, the power receiving element 400 may be disposed elsewhere along the periphery of the metal case 42.

Figure 5B:
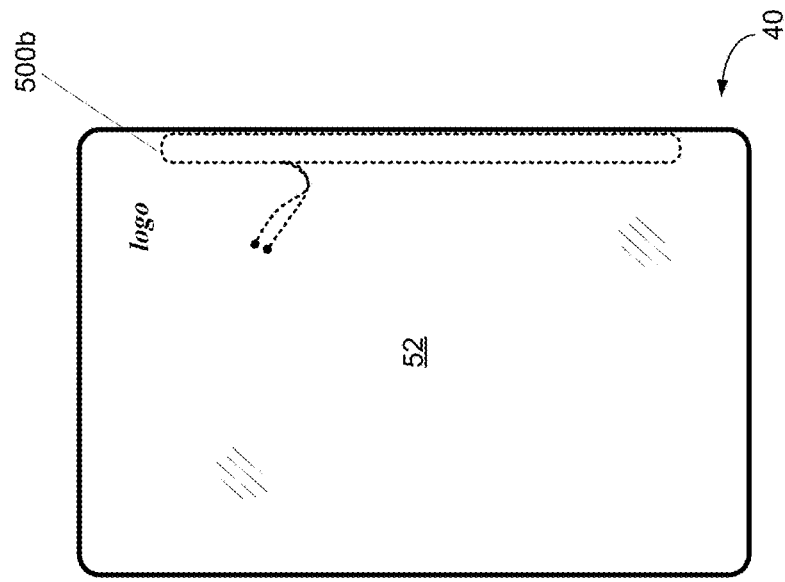
FIGS. 5A and 5B illustrate different (alternative) arrangements of a power receiving element in accordance with the present disclosure.
Figure 5A:
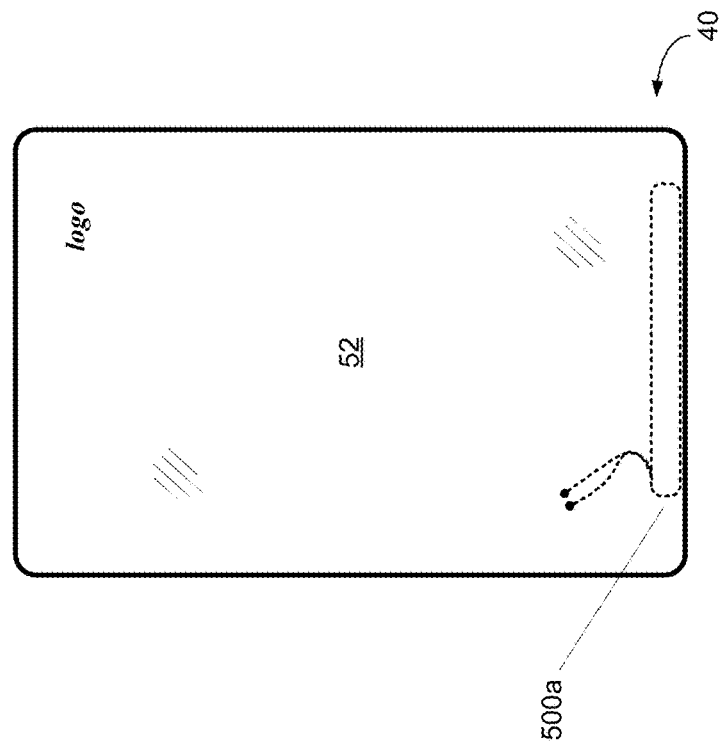

FIG. 5A, for example, shows in some embodiments a power receiving element 500*a* disposed at the bottom periphery of the metal case 52. The metal case 52 illustrates an example of a metal case that has no openings formed through the back side of the metal case; a logo is depicted to provide a top/bottom reference. FIG. 5B shows, in other embodiments, a power receiving element 500*b* disposed at a side (can be the right side or the left side) periphery of the metal case 52. The power receiving element 500*b* may have a greater length than power receiving element 500*a*, and thus may couple to more of the magnetic flux that emanates from the edge at the side periphery of the metal case 52.

Figure 6A:
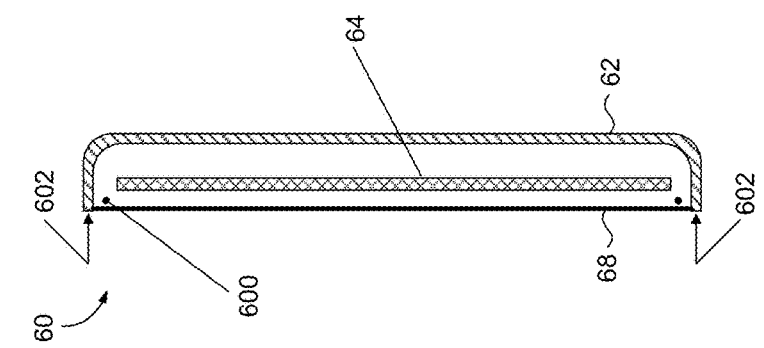
FIGS. 6 and 6A illustrate a placement example for a power receiving element and other aspects of an electronic device in accordance with some embodiments of the present disclosure.
Figure 6:
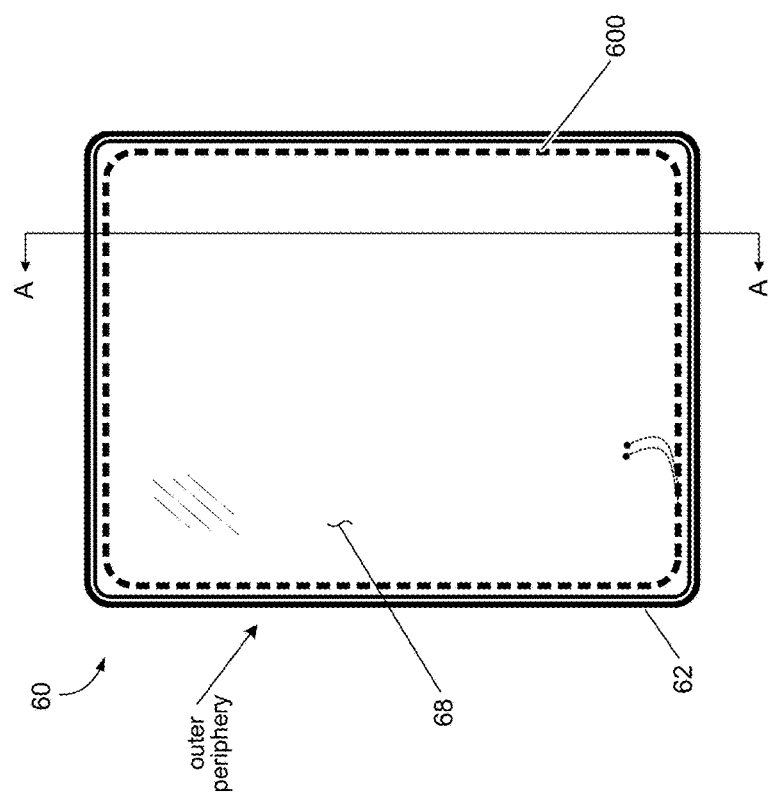

FIG. 6 shows an electronic device 60 in accordance with some embodiments of the present disclosure, looking at the front (display) side. FIG. 6A shows a cross sectional view taken along view line A-A in FIG. 6. In some embodiments, the electronic device 60 may include a metal case 62 to house electronics 64. The electronics 64 may include a processor, memory, communication electronics, touch sensitive display, battery, and the like. As shown in FIG. 6, the front side of the electronic device 60 may include a transparent cover 68 to enclose the electronics 64 in the metal case 62.

The electronic device 60 may include a power receiving element 600. In some embodiments, the power receiving element 600 may be arranged around or otherwise encircle an outer periphery of the metal case 62. The power receiving element 600 may have the form of a coil having multiple turns or windings. The power receiving element 600 may be arranged near or adjacent the transparent cover 68, close to the edge 602 of the metal case 62. As explained above, the proximity of the power receiving element 600 to the edge 602 allows for increased mutual inductance between the power receiving element 600 and the metal case 62, and hence increase the induced voltage in the power receiving element 600.

FIG. 7 shows an electronic device 70 in accordance with some embodiments of the present disclosure. FIGS. 7A 7B, 7C show cross sectional views taken along respective view line A-A, view line B-B, and view line C-C in FIG. 7. In some embodiments, the electronic device 70 may include a metal case 72 to house electronics 74, which may include a processor, memory, communication electronics, touch sensitive display, battery, and the like. As shown in FIG. 7, the front (display) side of the electronic device 70 may include a transparent cover 78 to enclose the electronics 74 in the metal case 72.

In some embodiments, the metal case 72 may have a cutout 72*a*. The cutout 72*a* may be used to expose communication antennas (not shown) through the metal case 72. A non-conductive (e.g., plastic) cap 76 may enclose the communication antennas. The cutout 72*a* may expose an additional edge 702*a* of the metal case 72 in addition to edge 702.

FIG. 7 shows that in some embodiments, the power receiving element 700 may be arranged around a circumferential periphery of the metal case 72. The cross sectional view of FIG. 7C shows that the power receiving element 700 may be disposed near the transparent cover 78, close to the edge 702 of metal case 72. FIG. 7B shows that a portion 700*a* of the power receiving element 700 may wrap around from the front side of the electronic device 70 toward the back side (FIG. 7D) of the electronic device 70, as the portion 700*a* of power receiving element 700 is arranged along the edge 702*a* created by cutout 72*a*. The cutout 72 can therefore provide radio access to the communication antennas (not shown) in the electronic device 70, and provide magnetic coupling, via the power receiving element 700, to the additional magnetic flux that may emanate from the edge 702*a*.

FIGS. 8A, 8B, and 8C show an electronic device 80 in accordance with some embodiments of the present disclosure. FIG. 8A shows the electronic device 80 as seen from the front side of the device, while FIG. 8B shows the electronic device 80 as seen from the back side of the device. FIG. 8C show a cross sectional view taken along view line C-C in FIG. 8A. In some embodiments, the electronic device 80 may include a metal case 82 to house electronics 84 (FIG. 8C), which may include a processor, memory, communication electronics, touch sensitive display, battery, and the like. As shown in FIGS. 8A and 8C, the front (display) side of the electronic device 80 may include a transparent cover 88 to enclose the electronics 84 in the metal case 82.

The electronic device 80 may include a power receiving element 800. The power receiving element 800 may be disposed around a circumferential periphery of the metal case 82, close to the edge 802 of the metal case 82.

The metal case 82 may include a cutout 82*a*, for example, to support the use of communication antennas (not shown) as explained above. The cutout 82*a* may define an additional edge 802*a* in the metal case 82. A non-conductive cap 86 may enclose the communication antennas.

In accordance with some embodiments of the present disclosure, the electronic device 80 may include a power receiving element 810. A first portion 810*a* of the power receiving element 810 may be disposed around a circumferential periphery of the metal case 82 adjacent to the power receiving element 800. A second portion 810*b* of the power receiving element 810 may wrap from the front side of the electronic device 80, following the edge 802*a* toward the back side (FIG. 8B) of the electronic device 80.

As explained above, the power receiving element 800 may couple to magnetic flux that emanates from the edge 802 of the metal case 82 as a result of eddy currents induced in the metal case 82 when illuminated by an externally generated magnetic field. A current may be induced in the power receiving element 800, which in turn may generate a magnetic field that emanates from the power receiving element 800. The power receiving element 810 may couple to the magnetic field generated by the power receiving element 800, which may induce a voltage in the power receiving element 810. A circuit 84*a* connected to the power receiving element 810 may rectify the induced voltage to produce output voltage $V_{out}$. In some embodiments, the circuit 84*a* may include tuning circuitry to tune the frequency of the power receiving element 810 for resonance with the externally generated magnetic field.

In accordance with some embodiments of the present disclosure, the power receiving element 800 may be connected to a tuning circuit 84*b* to tune a frequency of the power receiving element 800 for resonance with the externally generated magnetic field (e.g., time varying magnetic field 105, FIG. 1). For example, the tuning circuit 84*b* may be a capacitor to define a resonant frequency equal to the frequency of the externally generated magnetic field. In other embodiments, the resonant frequency of the power receiving element 800 may be tuned to be slightly out of resonance with the externally generated magnetic field. In some embodiments, the tuning circuit 84*b* may be omitted. The power receiving element 800 may therefore provide impedance conversion. For example, a power receiving element 800 that is resonant with the frequency of the externally generated magnetic field may reflect a high input impedance to the charging unit (not shown) that generates the external magnetic field, which may be undesirable. Accordingly, tuning the power receiving element 800 (e.g., using tuning circuit 84b) to be slightly out of resonance with the externally generated magnetic field can mitigate the high input impedance. Although not shown, one or more further power receiving elements may be included for additional impedance conversion.

In some embodiments, a sheet of ferrite material 822 may be disposed between the power receiving elements 800, 810 and the electronics 84. The ferrite 822 may shield the electronics 84 from any magnetic fields generated by the power receiving elements 800, 810 to prevent inducing potentially disruptive voltages or currents in the electronics 84. In other embodiments, the ferrite 822 may be omitted.

FIG. 9 shows the back side of an electronic device 90 in accordance with some embodiments of the present disclosure. In some embodiments, the electronic device 90 may include a metal case 92 to house the device body 90a. FIG. 9A shows the interior side of the metal case 92 with the cap 96 omitted. The metal case 92 may not extend the full height of the electronic device 90, leaving a portion of the device body 90a that is not housed by the metal case 92. The un-housed portion of the device body 90a may be enclosed by a non-conductive cap 96. The un-housed portion of electronic device 90 can house one or more communication antennas (not shown) to provide unimpeded transmission and reception of radio waves.

The electronic device 90 may include a power receiving element 900. In some embodiments in accordance with the present disclosure, the power receiving element 900 may be arranged near the edge 902 of the metal case 92 without crossing the edge 902. As an example, FIG. 4A shows the power receiving element 400 arranged on one side of the edge of the metal case 42, close to the edge 402 but does not cross the edge 402. FIG. 9, on the other hand, illustrate that in some embodiments, the power receiving element 900 may be arranged close to edge 902 and straddle or lie across the edge 902. For example, the power receiving element 900 may be arranged so that a portion of the power receiving element 900 runs on one side of edge 902 and another portion of the power receiving element 900 runs on the other side of edge 902.

FIG. 9B shows that in some embodiments, the exposed portion of the device body 90a may be at the bottom. The power receiving element 900 may be arranged toward the bottom of the electronic device 90 such that a portion of the power receiving element 900 runs on one side of edge 902 of the metal case 92 and another portion of the power receiving element 900 runs on the other side of edge 902.

In operation, the electronic device 90 may be illuminated by an externally generated magnetic field. For example, the electronic device 90 may be placed on a charging surface of a wireless charging unit (e.g., transmitter 104, FIG. 1). In response to the externally generated magnetic field, eddy currents may be induced in the metal case 92. The induced eddy currents, in turn, may create magnetic flux that can emanate from the edge 902 of metal case 92. The power receiving element 900 may couple to the magnetic flux, which can induce a voltage and current flow in the power receiving element 900. The induced voltage in the power receiving element 900 may be rectified by a rectifier circuit (e.g., 44a, FIG. 4) to produce wirelessly received power.

Figure 10A:
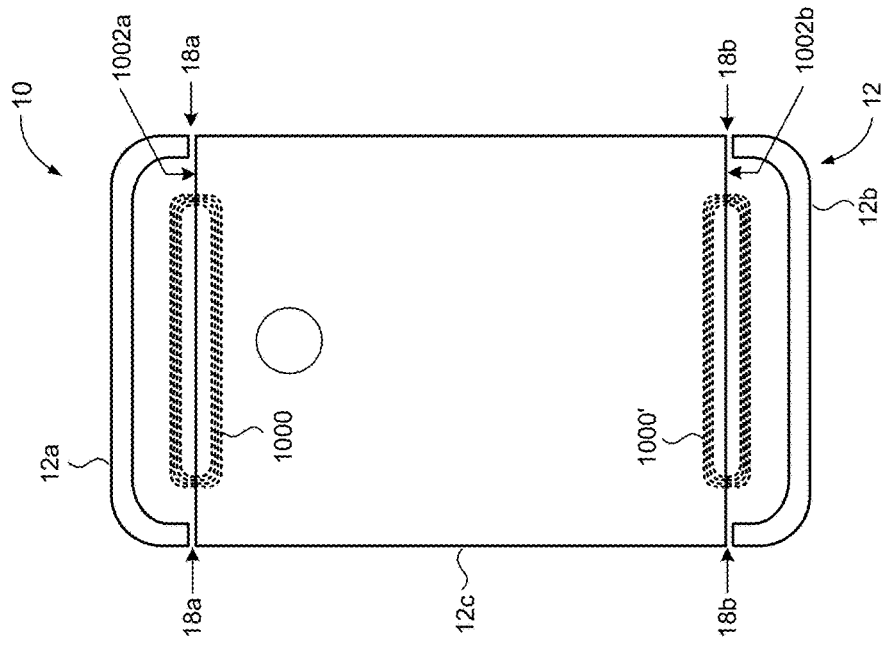
FIGS. 10A, 10B, and 10C illustrate an example of a power receiving element and other aspects of an electronic device in accordance with some embodiments of the present disclosure.
Figure 10B:
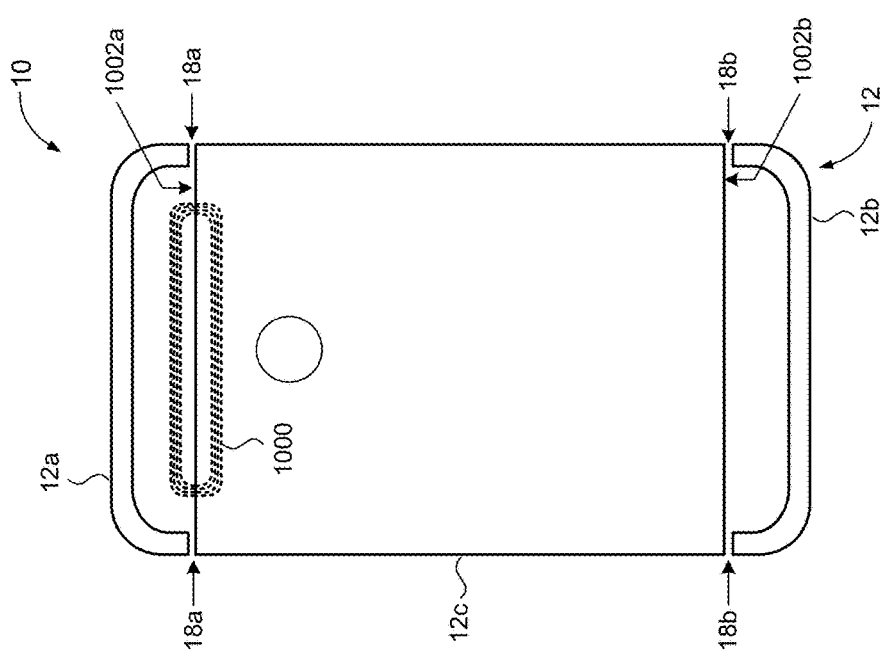

FIGS. 10A and 10B show an electronic device 10 in accordance with some embodiments of the present disclosure. The electronic device 10 may include a metal case 12 to house components (not shown) of the electronic device 10. In some embodiments, the metal case 12 may include antenna segments 12a, 12b and a main body segment 12c. The antenna segments 12a, 12b may be electrically separated from the main body segment 12c. For example, the antenna segment 12a may be spaced apart from the main body segment 12c by gaps 18a.

Figure 10C:
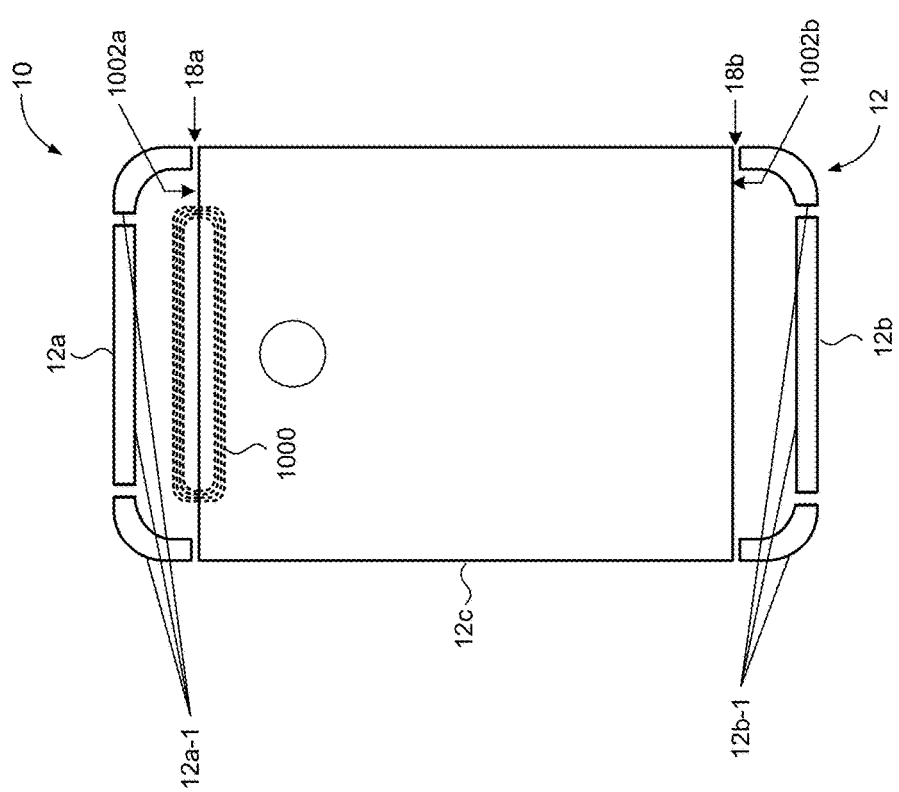

Likewise, the antenna segment 12b may be spaced apart from the main body segment 12c by gaps 18b. In some embodiments, the metal case 12 may only comprise a single antenna segment (e.g., 12a). FIG. 10C shows in some embodiments, the antenna segment 12a may comprise several individual antenna segments 12a-1, to define additional antennas. Similarly, the antenna segment 12b may comprise several individual antenna segments 12b-1, to define additional antennas. The individual antenna segments 12a-1, 12b-1 may be electrically separate from each other and configured for different functions such as cellular communication, GPS communication, WiFi communication, and so on.

The electronic device 10 may include a power receiving element 1000. In some embodiments the power receiving element 1000 may straddle or otherwise lie across an upper edge 1002a of the metal case 12, such as shown in FIG. 10A. In other embodiments (not shown), the power receiving element 1000 may straddle or otherwise lie across a lower edge 1002b of the metal case 12. FIG. 10B shows in some embodiments, the electronic device 10 may include a second power receiving element 1000'.

In operation, the electronic device 10 shown in FIG. 10A may be illuminated by an externally generated magnetic field. For example, the electronic device 10 may be placed on a charging surface of a wireless charging unit (e.g., transmitter 104, FIG. 1). In response to the externally generated magnetic field, eddy currents may be induced in the metal case 12. The induced eddy currents, in turn, may create magnetic flux that can emanate from the edge 1002a of metal case 12. The power receiving element 1000 may couple to the magnetic flux, which can induce a voltage and current flow in the power receiving element 1000. The induced voltage in the power receiving element 1000 may be rectified by a rectifier circuit (e.g., 44a, FIG. 4) to produce wirelessly received power. Referring to FIG. 10B, if the electronic device 10 includes a second power receiving element 1000', additional wirelessly received power may be produced by that additional power receiving element 1000'. In some embodiments, for example, the power receiving elements 1000 and 1000' may be connected together in series, and rectified by a single rectifier circuit (not shown). In other embodiments, each power receiving element 1000 and 1000' may have respective rectifier circuits (not shown). The rectifier outputs may be combined to define a single source of wirelessly received power, or the rectifier outputs may each be used as a source of power.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. An electronic device comprising:
electronic components;

a metal case configured to house the electronic components; and a power receiving element comprising a coil defining an area, the coil disposed on an inner portion of the metal case without openings within the area that permit the power receiving element to couple with an externally generated magnetic field and located adjacent to at least one edge of the metal case and configured to couple with a magnetic field that emanates from the at least one edge of the metal case when the metal case is exposed to the externally generated magnetic field, to wirelessly receive power from the externally generated magnetic field.

2. The electronic device of claim 1, further comprising a rectifier circuit among the electronic components electrically connected to the power receiving element and configured to rectify a voltage induced in the power receiving element to generate wirelessly received power.

3. The electronic device of claim 1, wherein the power receiving element is disposed on one side of the at least one edge of the metal case.

4. The electronic device of claim 3, wherein the at least one edge of the metal case is at a top, bottom, or side of the metal case.

5. The electronic device of claim 1, wherein the power receiving element encircles a periphery of the metal case.

6. The electronic device of claim 5, further comprising a display side and a transparent cover on the display side, wherein the power receiving element is disposed adjacent to the transparent cover.

7. The electronic device of claim 1, wherein the metal case includes a cutout at a periphery of the metal case, wherein at least a portion of the at least one edge of the metal case is located at the cutout.

8. The electronic device of claim 7, further comprising one or more antennas configured for wireless communication and exposed through the cutout of the metal case, wherein the electronic components comprise communication electronics, and the one or more antennas are communicably coupled to the communication electronics.

9. The electronic device of claim 1, further comprising an additional power receiving element configured to magnetically couple to the power receiving element.

10. The electronic device of claim 9, wherein the power receiving element is closer to the at least one edge of the metal case than is the additional power receiving element.

11. The electronic device of claim 1, wherein a portion of the power receiving element lies across the at least one edge of the metal case.

12. The electronic device of claim 1, wherein the metal case is disposed between a source of the externally generated magnetic field and the power receiving element.

13. A method for wireless power transfer comprising:
inducing eddy currents in a metal case configured to house an electronic device;
magnetically coupling to a magnetic field that emanates at a periphery of the metal case in response to the eddy currents induced in the metal case, using a power receiving element comprising a coil defining an area, the coil disposed on an inner portion of the periphery of the metal case without openings within the area that permit the power receiving element to couple with an externally generated magnetic field from outside of the metal case; and
generating wirelessly received power for the electronic device from a voltage induced in the power receiving element in response to magnetically coupling to the magnetic field that emanates from the periphery of the metal case.

14. The method of claim 13, further comprising magnetically coupling to flux lines of the magnetic field that emanate from the portion of the periphery of the metal case.

15. The method of claim 13, wherein the periphery of the metal case is at a top, bottom, or side of the metal case.

16. The method of claim 13, further comprising magnetically coupling to a magnetic field that emanates at a circumferential periphery of the metal case.

17. The method of claim 13, further comprising magnetically coupling to a magnetic field that emanates from the power receiving element using an additional power receiving element.

18. The method of claim 17, further comprising tuning the additional power receiving element to have a resonant frequency substantially equal to a frequency of an externally generated magnetic field used to induce the eddy currents.

19. The method of claim 13, further comprising illuminating the metal case with an externally generated magnetic field to induce the eddy currents in the metal case.

20. The method of claim 18, further comprising setting a resonant frequency of the power receiving element substantially equal to a frequency of the externally generated magnetic field.

21. The method of claim 18, further comprising operating the power receiving element at a frequency substantially equal to a frequency of the externally generated magnetic field.

22. The method of claim 13, further comprising rectifying the voltage induced in the power receiving element to generate the wirelessly received power.

23. An electronic device comprising:
means for housing components that comprise the electronic device, the means for housing including a metal case;
means for magnetically coupling to an externally generated magnetic field to wirelessly receive power, the means for magnetically coupling disposed on an inner portion defining an area of the metal case the means for housing without openings that permit the power receiving element to couple with an externally generated magnetic field from outside of the metal case; and
means for producing wirelessly receive power from the means for magnetically coupling.

* * * * *